P. P. NUNGESSER.
FASTENING DEVICE FOR WIRE TERMINALS.
APPLICATION FILED JUNE 9, 1911.
1,023,271.
Patented Apr. 16, 1912.
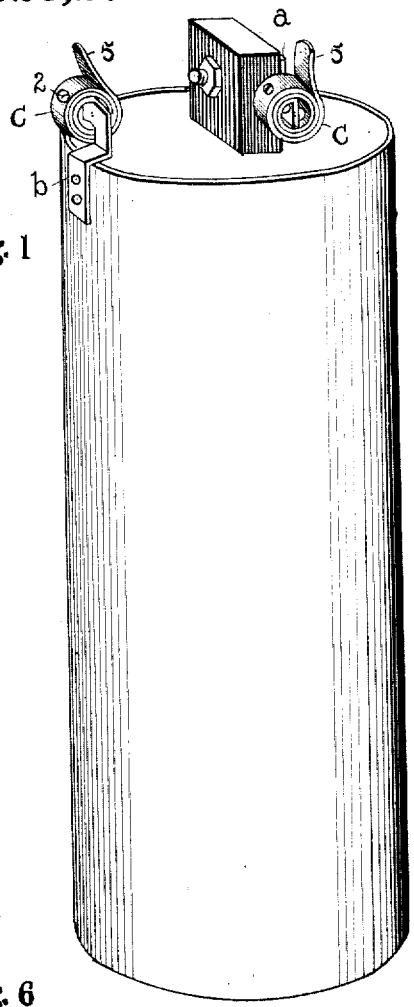
Fig. 1
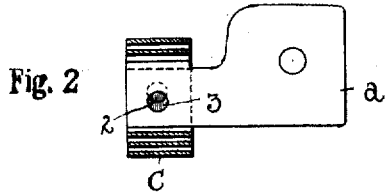
Fig. 2
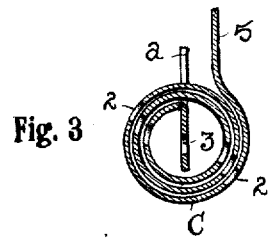
Fig. 3
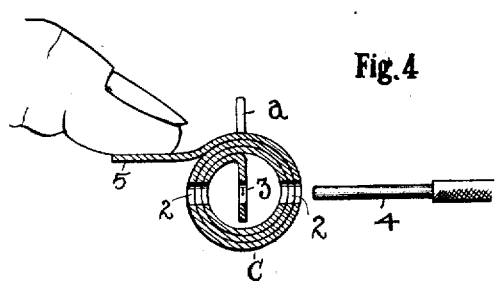
Fig. 4
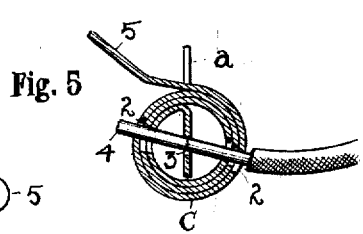
Fig. 5
Fig. 6
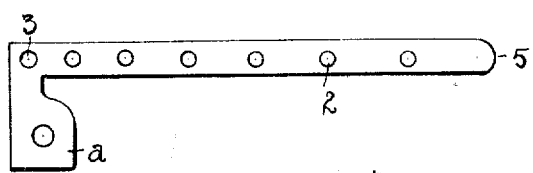
Fig. 7
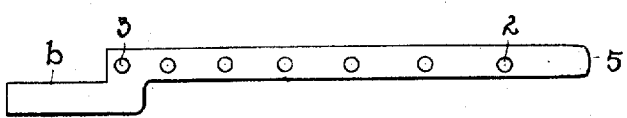
ATTEST
E. M. Fisher
C. F. Franke
INVENTOR
PHILIP P. NUNGESSER
BY Fisher & _____ ATTYS.

UNITED STATES PATENT OFFICE.

PHILIP P. NUNGESSER, OF CLEVELAND, OHIO, ASSIGNOR TO THE NUNGESSER ELECTRIC BATTERY COMPANY, OF CLEVELAND, OHIO, A CORPORATION.

FASTENING DEVICE FOR WIRE-TERMINALS.

1,023,271.   Specification of Letters Patent.   Patented Apr. 16, 1912.

Application filed June 9, 1911. Serial No. 632,142.

*To all whom it may concern:*

Be it known that I, PHILIP P. NUNGESSER, citizen of the United States, residing at Cleveland, in the county of Cuyahoga and State of Ohio, have invented certain new and useful Improvements in Fastening Devices for Wire-Terminals, of which the following is a specification.

This invention relates to a fastening device for wire terminals, and while the device is shown herein in connection with a dry battery cell it is not limited to such use, as is obvious.

In the accompanying drawings, Figure 1 is a perspective view of a dry battery cell showing the invention in duplicate, for both electrodes. Fig. 2 is a sectional elevation of said device and Fig. 3 is a sectional elevation centrally of the coil in normal condition and showing the holes for the wires out of staggered alinement. Fig. 4 is an elevation on the same line as Fig. 3 but showing the coils or convolutions of the coil closed and the holes in line to introduce the wire. Fig. 5 shows the relations of the coils when a wire is gripped therein. Figs. 6 and 7 show the blanks from which the coils are made.

The invention as thus shown resides essentially in the coil C as a whole constructed of spring sheet metal cut into lengths and bent to three convolutions or windings in this instance with holes 2 at slightly increasing intervals from the base to the outer end, so that each convolution will have two holes approximately diametrically opposite and adapted to be brought into alinement, say as seen in Fig. 4, when the coils are turned for this purpose but staggered as between coils or turns when the spring is normal.

The two coils shown in Fig. 1 are alike but have different base or bracket portions or ends, *a* and *b*, respectively, according as they are meant to occupy one position or the other on the cell, or in some other connection, said base ends serving as supports for the coils for the most part. However, the said ends also have holes 3 in their inner portion which serve to pass the wire through and help to hold it frictionally.

The end 5 of the coil projects outwardly away from the coil and provides an extension adapted to bear the thumb or finger upon to contract or constrict the coil and thus bring all said holes 2 into alinement for entering the wire terminal 4 therein. Normally said holes are staggered as seen in Fig. 2, and they seek this relation naturally after the wire has been entered, so that thereby they come into a frictional locking relation or engagement with the wire in all or practically all said holes and in the aggregate make an effectual grip from which the wire can not be drawn except by a very strong pull. This also makes a multiple electric contact which assures a free flow of the current and avoids heating in the connections.

In operation, when it is desired either to engage or release a wire, the thumb is pressed upon the extremity 5 and the coil is thus contracted all around until at last the contraction brings the holes 2 opposite one another. This being done the wire can be inserted through said holes and the spring released. Then the spring catches the wire and holds it substantially as shown. The circular edge of the round openings 2 are sharp and necessarily bite into the wire, thereby making good electrical contact and also a strong grip at a plurality of points. However, other shaped openings than round may be used, and any equivalent thereof to provide gripping edges will be regarded as a substitute.

What I claim is:

1. A fastener for wire terminals consisting of flat spring metal bent into a plurality of coils and having a plurality of holes through each coil adapted to be brought into alinement.

2. A fastener for wire terminals consisting of a sheet metal spiral spring with two or more coils adapted to be contracted and each coil provided with two openings, said openings being staggered when the fastener is normal and in line when contracted.

3. A coil for wire terminals formed from a strip of flat spring metal having a series of engaging portions spaced apart with slightly increasing spaces from base to outer end and said engaging portions approximately opposite each other and adapted to frictionally engage a wire thereby.

4. An electrical terminal fastening device comprising an open convolute spring provided with a series of gripping edges spaced apart at irregular intervals and adapted to be alined to insert or release an electrical terminal connection.

5. A fastener for wire terminals formed of spring sheet metal bent into a plurality of coils and said coils having holes approximately diametrically opposite in each coil.

6. A fastener for wire terminals consisting of a coil of sheet metal having a plurality of convolutions adapted to be contracted and each convolution constructed at two places substantially opposite each other diametrically to frictionally engage a wire terminal therewith.

7. A fastener for wire terminals formed of spring metal and having a plurality of coils provided with a plurality of wire-engaging edges to grip a wire by expansion of the coils, said coils having separate projecting extremities adapted to fix the same in working position and to contract the coil.

8. A fastener for wire terminals having a plurality of spring coils with holes through the several coils adapted to insert a wire through the same, said fastener constructed at its inner end with a lateral projection and free at its outer end, and said inner end having a base portion with a hole to engage a wire therein.

In testimony whereof I affix my signature in presence of two witnesses.

PHILIP P. NUNGESSER.

Witnesses:
E. M. FISHER,
F. C. MUSSUN.